May 3, 1960 G. O. K. SCHNEIDER 2,935,627
PRIORITY DEMAND CIRCUITS
Filed Aug. 20, 1958
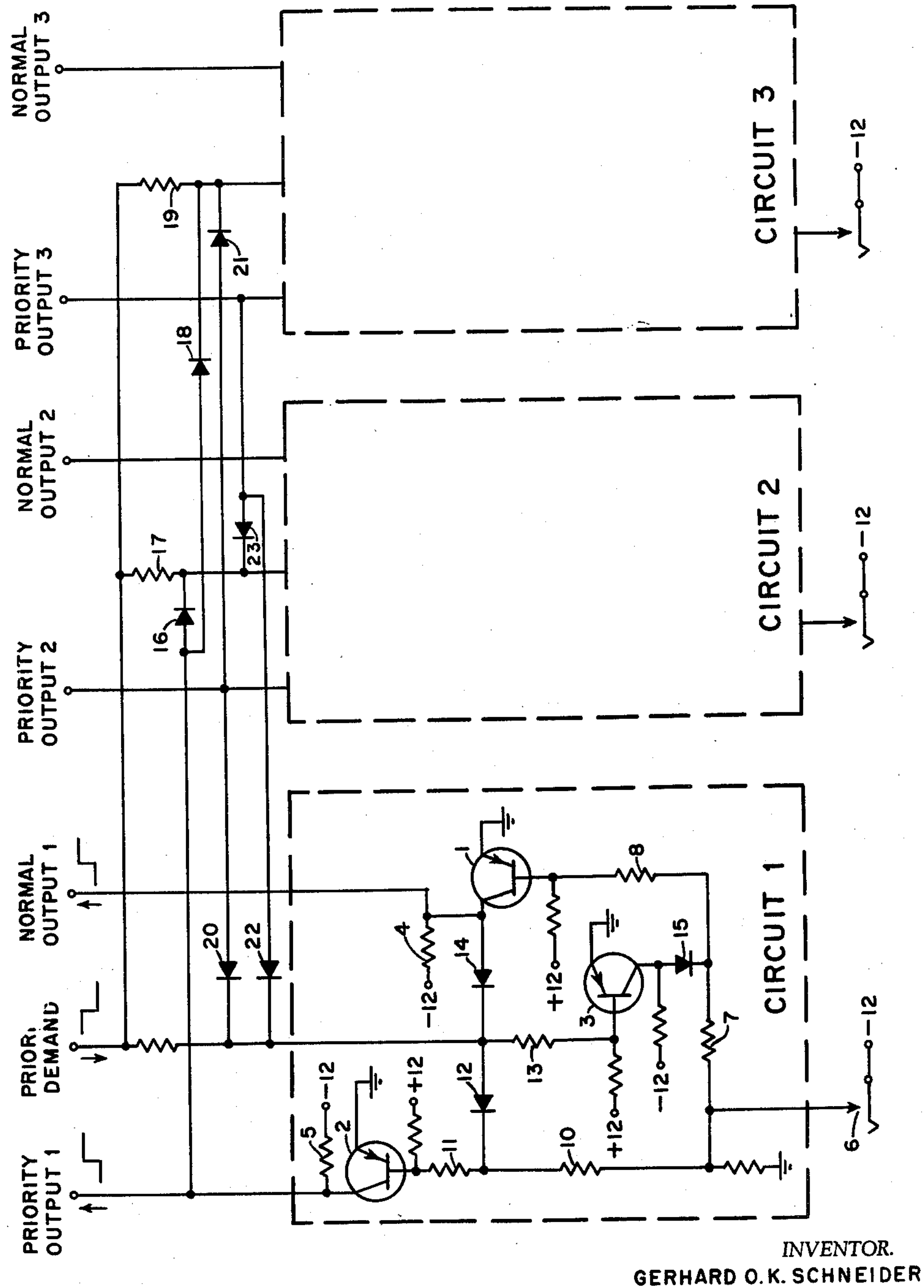
INVENTOR.
GERHARD O. K. SCHNEIDER
BY F. H. Henson
ATTORNEY United States Patent Office 2,935,627

Patented May 3, 1960

2,935,627

PRIORITY DEMAND CIRCUITS

Gerhard O. K. Schneider, Rochester, N.Y., assignor to General Dynamics Corporation, Rochester, N.Y., a corporation of Delaware Application August 20, 1958, Serial No. 756,175

6 Claims. (Cl. 307—88.5)

This invention relates in general to electronic switching systems and, more particularly, to priority demand circuits for use in electronic switching systems.

Priority demand circuits, which may be defined as control circuits which normally function to control low priority circuits but upon demand function to control high priority circuits, find use in many types of electronic switching systems. For example, the priority demand circuits herein disclosed are also shown and described as an integral part of the electronic switching telephone system disclosed in copending application Serial No. 739,724, filed June 4, 1958, now Patent No. 2,886,656, and assigned to the same assignee as the present invention. The telephone system disclosed in the above-identified application comprises a plurality of operator positions, a plurality of operator link circuits common to said positions, and a single recall link circuit common to said operator positions. The link circuits of the system are enabled one at a time for connection to any one of the operator positions in the same order that calls are completed from calling lines to said link circuits and each link circuit is released for use on another call as soon as the call on that link circuit has been answered and further extended by one of the operator positions. A single recall link circuit is provided in the system for scanning the previously established connections for recall signals and if a recall signal is detected on any one of the previously established connections, the recall link circuit seizes that connection and is immediately enabled for connection to any one of the operator positions. Since a single answer key is provided at each operator position, it is necessary to provide a priority demand circuit at each operator position, which circuit functions either to relay an output signal to the enabled link circuit if the high priority recall link circuit is not demanding answer service when the answer key is operated, or to relay an output signal to the recall link circuit if the recall link circuit is demanding answer service when the answer key is operated.

It is the general object of this invention to provide new and improved priority demand circuits for use in electronic switching systems.

In accordance with this invention, each priority demand circuit comprises first, second, and third signal translating devices, which may be transistors, normally biased for non-conduction, the normal output conductor of the circuit is energized when the first device becomes conductive, and the priority output conductor of the circuit is energized when the second device becomes conductive. The first device is rendered conductive only if the third device is non-conductive at the time that the answer key or switch associated with that circuit is operated, the second device is rendered conductive only if a demand signal is applied to the priority demand input conductor at the time that the switch is operated, the third device is rendered conductive only if the first device is non-conductive at the time that a demand signal is applied to the input conductor, and means is provided for preventing the second device from becoming conductive if the first device is conductive at the time that a demand signal is applied to the input conductor. Thus, the normal output conductor of the circuit is energized when the switch is operated if a demand signal is not applied to the input conductor, the priority output conductor of the circuit is energized when the switch is operated if a demand signal is applied to the input conductor, and a demand signal applied to the input conductor after the switch has been operated to energize the normal output conductor has no effect on the circuit. Means is also provided for discontinuing the application of the demand signal to the remaining priority demand circuits when the priority output conductor of any one of the circuits is energized, thus indicating that the priority demand has been answered by that circuit.

Further objects and advantages of the invention will become apparent as the following description proceeds, and features of novelty which characterize the invention are pointed out in particularity in the claims annexed to and forming a part of this specification.

For a better understanding of the invention, reference may be had to the accompanying drawing which shows circuit details of a priority demand circuit and the interconnections between three priority demand circuits.

As shown in the drawing, each priority demand circuit comprises first, second, and third junction transistors, identified as transistors 1, 2, and 3, respectively. The collector of transistor 1 is connected to the normal output conductor and returned to minus twelve volt potential through resistor 4. The collector of transistor 2 is connected to the priority output conductor and returned to minus twelve volt potential through resistor 5. When the answer key or switch 6, which has been illustrated as a mechanical switch although the switch may be of the electronic type, is in its normal unoperated condition, the base of each of the transistors 1, 2, and 3 is positive with respect to the emitter of the transistor and all of the transistors, which are illustrated as being of the PNP type, are thereby biased for non-conduction.

To illustrate the operation of the circuit, assume that ground potential is applied to the priority demand input conductor, thus indicating that there is no priority demand, at the time that switch 6 is operated. Under these conditions, negative potential is applied through switch 6 and resistors 7 and 8 to the base of transistor 1 and transistor 1 is rendered conductive to apply ground potential to the normal output conductor of the circuit. Transistor 2 is prevented from becoming conductive when switch 6 is operated under these conditions since the junction point of resistors 10 and 11 is clamped to the ground potential appearing on the priority demand input conductor through diode 12. If a negative demand signal is applied to the priority demand input conductor while transistor 1 is conductive, the demand signal has no effect on the circuit since the upper terminal of resistor 13 and the anode terminal of diode 12 are clamped through diode 14 to ground potential appearing at the collector of conducting transistor 1. When switch 6 is restored to its unoperated condition, transistor 1, of course, becomes non-conductive.

Next assume that a negative demand signal is applied to the priority demand input conductor while switch 6 is in the unoperated condition. Under these conditions, the base of transistor 3 goes negative and transistor 3 is rendered conductive to apply ground potential through diode 15 to the junction point of resistors 7 and 8. Now, when switch 6 is operated, the base of transistor 2 goes negative and transistor 2 is rendered conductive to apply ground potential to the priority output conductor of the circuit. Transistor 1, of course, remains non-conductive because of the application of ground potential through diode 15 to the junction point of resistors 7 and 8. It can be seen that ground potential applied to the conductor priority output 1 is coupled through diode 16 to the lower terminal of resistor 17 and through diode 18 to the lower terminal of resistor 19 to thereby discontinue the application of the demand signal to the input conductors of those circuits and thereby render the transistor corresponding to transistor 3 in each of those circuits non-conductive if that transistor is conductive. Similarly, when a priority demand is answered by circuit 2, the application of the demand signal to the input conductors of circuits 1 and 3 is discontinued by ground clamping through diodes 20 and 21, respectively, and when a priority demand is answered by circuit 3, the application of the demand signal to the input conductors of circuits 1 and 2 is discontinued by ground clamping through diodes 22 and 23, respectively.

To summarize, a demand signal applied to the priority demand input conductor serves to render conductive the transistor corresponding to transistor 3 in each circuit in which the switch 6 is not operated, the key next operated controls its associated circuit to energize the priority output conductor associated with that circuit, and the application of the demand signal to the input conductors of the remaining circuits is thereby terminated so that the conducting transistors corresponding to transistor 3 in those circuits are rendered non-conductive. The operation of the switch in any one of the other circuits will thereafter control its associated circuit to energize the normal output conductor for that circuit.

While there has been shown and described what is at present considered to be the preferred embodiment of the invention, modifications thereto will be readily apparent to those skilled in the art. It is not desired, therefore, that the invention be limited to the embodiment shown and described, and it is intended to cover in the appended claims all such modifications as fall within the true spirit and scope of the invention.

What is claimed is:

1. A priority demand circuit comprising first, second, and third signal translating devices, each of said devices having a current-emissive electrode, a current-receiving electrode, and a control electrode, an input conductor, a normal output conductor, a priority output conductor, a switch, means for returning the current-emission electrode of each device to a point of reference potential, means for connecting the current-receiving electrode of said first device to said normal output conductor, means for connecting the current-receiving electrode of said second device to said priority output conductor, means for at times applying a demand signal to said input conductor, means for normally biasing each of said devices for non-conduction, means responsive to the operation of said switch only when said third device is non-conductive for applying a signal to the control electrode of said first device to render said first device conductive, means responsive to the operation of said switch only when said demand signal is applied to said input conductor for applying a signal to the control electrode of said second device to render said second device conductive, means responsive to the application of said demand signal to said input conductor only when said first device is non-conductive for applying a signal to the control electrode of said third device to render said third device conductive, and means for preventing the application of a signal to the control electrode of said second device when a demand signal is applied to said input conductor at a time when said switch is operated and said first device is conductive.

2. The combination of claim 1 in which each of said devices is a transistor, the current-emissive electrode is an emitter, the current-receiving electrode is a collector, and the control electrode is a base.

3. A priority demand circuit comprising first, second, and third transistors, each of said transistors having a base, an emitter, and a collector, an input conductor, a normal output conductor, a priority output conductor, means for connecting the collector of said first transistor to said normal output conductor, means for connecting the collector of said second transistor to said priority output conductor, means for at times applying a demand signal to said input conductor, a switch, means for biasing the base and emitter of said first transistor in the forward direction to render said first transistor conductive only when said switch is operated and said third transistor is non-conductive, means for biasing the base and emitter of said second transistor in the forward direction to render said second transistor conductive only when said switch is operated, said demand signal is applied to said input conductor, and said first transistor is non-conductive, and means for biasing the base and emitter of said third transistor in the forward direction to render said third transistor conductive only when said demand signal is applied to said input conductor and said first transistor is non-conductive.

4. A plurality of priority demand circuits, each of said circuits comprising first, second, and third signal translating devices each having a current-emissive electrode, a current-receiving electrode, and a control electrode, a switch, an input conductor, a normal output conductor, and a priority output conductor, means for returning the current-emissive electrode of each device in each circuit to a point of reference potential, means in each circuit for connecting the current-receiving electrode of the first device in that circuit to the normal output conductor of that circuit, means in each circuit for connecting the current-receiving electrode of the second device in that circuit to the priority output conductor of that circuit, means in each circuit for normally biasing each of the devices in that circuit for non-conduction, means in each circuit responsive to the operation of the switch in that circuit only when the third device in that circuit is non-conductive for applying a signal to the control electrode of the first device in that circuit to render said first device conductive, means in each circuit responsive to the operation of the switch in that circuit only when said demand signal is applied to the input conductor of that circuit for applying a signal to the control electrode of the second device in that circuit to render said second device conductive and thereby energize the priority output conductor of that circuit, means in each circuit responsive to the application of said demand signal to the input conductor of that circuit only when the first device in that circuit is non-conductive for applying a signal to the control electrode of the third device in that circuit to render said third device conductive, means in each circuit for preventing the application of a signal to the control electrode of the second device in that circuit when a demand signal is applied to the input conductor of that circuit at a time when the first device in that circuit is conductive, and means responsive to the energization of the priority output conductor of any one of said circuits for discontinuing the application of said demand signal to the input conductors of the remaining circuits.

5. The combination of claim 4 in which each of said devices is a transistor, the current-emissive electrode is an emitter, the current-receiving electrode is a collector, and the control electrode is a base.

6. A plurality of priority demand circuits, each of said circuits comprising first, second, and third transistors each having a base, an emitter, and a collector, a switch, an input conductor, a normal output conductor, and a priority output conductor, means in each circuit for connecting the collector of the first transistor in that circuit to the normal output conductor of that circuit, means in each circuit for connecting the collector of the second transistor in that circuit to the priority output conductor of that circuit, means for at times applying a demand signal to the input conductor of each of said circuits, means in each circuit for forward biasing the base and emitter of the first transistor in that circuit to render said first transistor conductive only when the switch in that circuit is operated and the third transistor in that circuit is non-conductive, means in each circuit for forward biasing the base and emitter of the second transistor in that circuit to render said second transistor conductive only when the switch in that circuit is operated, said demand signal is applied to the input conductor of that circuit, and the first transistor in that circuit is non-conductive, means in each circuit for forward biasing the base and emitter of the third transistor in that circuit to render said third transistor conductive only when said demand signal is applied to the input conductor of that circuit and the first transistor in that circuit is non-conductive, and means responsive to the conduction of the second transistor in any one of said circuits for discontinuing the application of said demand signal to the input conductors of the remaining circuits.

References Cited in the file of this patent

UNITED STATES PATENTS

| | | |
|---|---|---|
| 1,968,420 | Powell | July 31, 1934 |
| 2,352,107 | Kessler | June 20, 1944 |
| 2,656,416 | Kessler | Oct. 20, 1953 |
| 2,686,843 | Shafer | Aug. 17, 1954 |
| 2,725,427 | Murray | Nov. 29, 1955 |
| 2,754,368 | Dunlap | July 10, 1956 |